(12) United States Patent
Takanishi et al.

(10) Patent No.: US 7,598,695 B2
(45) Date of Patent: Oct. 6, 2009

(54) QUADRUPED WALKING ROBOT

(75) Inventors: Atsuo Takanishi, 2-19-9-216, Matsugaoka, Nakano-ku, Tokyo 165-0024 (JP); Yoichi Takamoto, Fukuoka (JP); Katsuyuki Baba, Fukuoka (JP); Hideki Nishizawa, Fukuoka (JP)

(73) Assignees: Tmsuk Co., Ltd., Fukuoka (JP); Atsuo Takanishi, Tokyo (JP)

( * ) Notice: Subject to any disclaimer, the term of this patent is extended or adjusted under 35 U.S.C. 154(b) by 185 days.

(21) Appl. No.: 11/579,448

(22) PCT Filed: Mar. 30, 2005

(86) PCT No.: PCT/JP2005/006147

§ 371 (c)(1),
(2), (4) Date: Nov. 2, 2006

(87) PCT Pub. No.: WO2006/103775

PCT Pub. Date: Oct. 5, 2006

(65) Prior Publication Data

US 2008/0252247 A1 Oct. 16, 2008

(51) Int. Cl.
*B62D 57/032* (2006.01)
*B25J 17/00* (2006.01)

(52) U.S. Cl. .............. 318/568.12; 318/568.2; 318/14; 318/15; 901/1

(58) Field of Classification Search ........... 318/9–15, 318/568.11, 568.12, 568.2; 901/1
See application file for complete search history.

(56) References Cited

U.S. PATENT DOCUMENTS

| | | | | |
|---|---|---|---|---|
| 4,614,504 A | * | 9/1986 | Yamasaki | 446/356 |
| 6,422,329 B1 | * | 7/2002 | Kazerooni et al. | 180/19.3 |
| 6,472,839 B1 | * | 10/2002 | Ishii et al. | 318/568.12 |
| 6,481,512 B1 | * | 11/2002 | Nagatsuka | 180/8.1 |
| 6,567,724 B2 | * | 5/2003 | Yamamoto | 700/261 |
| 2005/0275367 A1 | * | 12/2005 | Buehler et al. | 318/568.12 |

FOREIGN PATENT DOCUMENTS

| | | |
|---|---|---|
| JP | 58-171278 A | 10/1983 |
| JP | 60-245869 A | 12/1985 |
| JP | 3-11582 U | 2/1991 |
| JP | 2002-011679 A | 1/2002 |
| JP | 2003-80477 A | 3/2003 |

* cited by examiner

*Primary Examiner*—Bentsu Ro
(74) *Attorney, Agent, or Firm*—Sughrue Mion, PLLC (57) ABSTRACT

A quadruped walking robot, comprising a body part having a horizontal swing part, a horizontal swing drive part, an upper side upper leg part pivotally supported on the horizontal swing part, a lower side upper leg part disposed parallel with the lower part of the upper side upper leg part, an upper leg rotatingly driving part rotatingly driving the upper side upper leg part, a lower leg part having an upper end part to which the tip part of the upper side upper leg part and the tip part of the lower side upper leg part are pivotally connected on the upper and lower sides, and ground-contact part disposed at the lower end part of the lower leg part, and an elastic extensible part disposed at the middle part of the lower side upper leg part and elastically extending/retracting in the longitudinal direction.

5 Claims, 6 Drawing Sheets

QUADRUPED WALKING ROBOT

FIELD OF THE INVENTION

The present invention relates to a quadruped (four-legged) walking robot having four leg sections and is self-moving by actuating the respective leg sections.

BACKGROUND OF THE INVENTION

Conventionally, various self-moving robots have been developed, some of which have wheels, others of which have caterpillars, and still others of which have leg sections. As a walking robot having leg sections, multi-legged walking robots such as a biped or two-legged robot, a three-legged robot, a quadruped or four-legged robot, a six-legged robot, etc., have been developed. In particular, various types of quadruped walking robots have recently been developed in view of high stability in walking motions, and by a reason that these robots are manufactured mimicking a four-legged animal such as, for example, a dog, a cat, etc.

A walking motion of the quadruped walking robot is carried out in such a manner that, for example, in a state where the tip ends of the three legged sections are grounded to support the weight of a main body portion, etc., the remaining one leg is grounded after being moved to another point of the ground using the leg as a free or idle leg, and walking and movement are executed with the weight of a robot supported, by changing over such grounding legs and an idle leg at the respective leg sections by turns.

As such a quadruped walking robot, Patent Document 1 refers to a multi-legged walking robot in which a plurality of legs or leg sections are provided for the sides of the main body portion, and describes a construction in which the respective legs are provided with the first turning axis, the second turning axis and the third turning axis. A leg of the quadruped walking robot according to Patent Document 1 is composed of a first unit disposed at the side of the main body portion, a second unit attached to the first unit via a first joint portion, and a third unit attached to the second unit via a second joint portion, wherein the first joint portion is composed of a first turning axis having its axial direction in the direction parallel to the side of the main body portion, and a second turning axis having its axial direction in the perpendicular direction to the side of the main body portion, and the second joint portion is composed of a third turning axis parallel to the second turning axis.

Patent Document 1: Japanese Published Unexamined Patent Application No. 2002-11679

DISCLOSURE OF THE INVENTION

Problems to be Solved by the Invention

However, the above-described conventional multi-legged walking robot has the following problems.

(1) Since the first, the second and the third turning axes are turned in a multi-legged walking robot according to Patent Document 1, it is necessary to provide a driving portion such as a motor to drive the respective turning axes, wherein twelve driving portions are totally required in a case of four legs. Therefore, there is a problem that the number of driving portions is increased, the production costs thereof are remarkably raised, and the weight is incidentally increased.

(2) Also, only by reducing the number of turning axes in order to decrease the number of driving portions, the degree of freedom of the legs is reduced, wherein since it becomes impossible to move the tips of the legs to optional positions, stabilized walking control cannot be carried out, and in particular where ZMP control is executed to carry out stabilized walking, the tips of the ground legs cannot be moved to optional positions. Therefore, there are other problems that the balance of the robot is worsened, the tips of the legs slip on the ground during walking, and the walking is not stabilized.

The present invention has been made to solve the above-described conventional problems, and an object thereof is to provide a quadruped walking robot capable of achieving a decrease in production costs and lightening the weight thereof by reducing the number of driving portions and capable of carrying out stabilized walking motions even if the degree of freedom in the leg sections is lowered.

Means for Solving the Problems

In order to solve the above-described problems, a quadruped walking robot according to the present invention includes the following construction.

A quadruped walking robot according to a first aspect of the present invention has four leg sections at the sides of a main body portion, wherein the leg section includes a horizontal swivel portion disposed so as to freely swivel in the horizontal direction in the main body portion; a horizontal swivel driving portion disposed in the main body portion, which drives and turns the horizontal swivel portion in the horizontal direction; an upper side upper leg portion rotatably axially attached to the horizontal swivel portion so as to freely turn in the vertical direction; a lower side upper leg portion disposed roughly parallel to the lower part of the upper side upper leg portion, which is rotatably axially attached to the horizontal swivel portion so as to freely turn in the vertical direction; an upper leg driving and turning portion disposed in the horizontal swivel portion, which drives and turns the upper side upper leg portion in the vertical direction; a lower leg portion in which the distal end part of the upper side upper leg portion and the distal end part of the lower side upper leg portion are axially supported vertically at the upper end portion; and a grounding portion disposed at the lower end portion of the lower leg portion; wherein the lower side upper leg portion is provided with a resilient extension and contraction portion that is disposed at an intermediate part thereof and is resiliently extended and contracted in the lengthwise direction.

With such a construction, the following actions can be brought about.

(1) Since the upper side upper leg portion is driven and turned in the upward direction or the downward direction by driving the upper leg driving and turning portion of the leg portion, it is possible to make the lower leg portion into an idle leg by moving the same in the upward direction and to ground it by moving the same in the downward direction. Also, by driving the horizontal swivel driving portion and moving the horizontal swivel portion in the right direction or the left direction when the leg portion is an idle leg, it is possible to swivel the leg portion in the forward direction or the backward direction.

(2) By carrying out a crawl-walking motion in which a motion of making the lower leg portion of the leg portion into an idle leg by moving it upward, swiveling the leg portion in the forward direction and grounding the same is executed one after another in the respective leg portions, it is possible to cause the quadruped walking robot to advance, retract and turn. At this time, the posture of the main body portion is controlled by a control unit, with the main body portion supported by three leg portions other than the leg portion which is made into an idle leg, so that the ZMP (Zero Moment Point) which is a point on the ground on which the total sum of the gravities of the respective parts of the quadruped walking robot and the moments based on inertia forces are made into zero is positioned inside a triangle for which the grounding points of the grounding legs are made into vertices thereof, a so called supporting polygon. Accordingly, stabilized walking motions can be carried out.

(3) By resiliently extending and contracting the resilient extension and contraction portion, it is possible to vary the inclination of the lower leg portion with respect to the upper side upper leg portion, wherein the posture of the leg portions can be varied in association with movement of the main body portion and the posture thereof at the time. Accordingly, even a dual-driving system that has two driving portions per leg portion can bring about stabilized walking motions without the grounding portion slipping on the ground.

(4) Since the leg portion is composed of the dual-driving system that has two driving portions per leg portion, it is possible to reduce the number of driving portions in comparison with a triple-driving system, wherein the production costs can be lowered, and at the same time, the weight can be lightened.

(5) Although the leg portion is a dual-driving system including two driving portions, it is possible to achieve a walking motion close to a normal triple-driving system and three degrees of freedom since the lower side upper leg portion includes a resilient extension and contraction portion.

Herein, the quadruped walking robot is provided with four leg portions, each of which is located at both sides of the front part and the rear part of the main body portion thereof. In a state where the grounding portions of the three leg portions thereof are grounded and support the weight of the main body portion, the remaining one leg portion is made into an idle leg and is moved to another point of the ground. After that, the leg portion is grounded there. That is, it is possible to execute a crawl walking motion in which walking is carried out by alternately changing over the grounding leg portions and the idle leg for all leg portions, and a trot walking motion in which walking is carried out by making one pair of diagonal leg portions of the four leg portions, for example, the leg portion at the right side portion of the front part and the leg portion at the left side portion of the rear part into idle legs, and making the remaining two legs into grounding legs, and alternately changing over the idle leg portions and the grounding leg portions. In addition, where a trot walking motion is carried out by providing a locking mechanism portion so that the sliding portion of the resilient extension and contraction portion is locked at the tubular portion so as not to be extended and contracted, it is preferable that the resilient extension and contraction portion is locked by operating the locking mechanism portion.

A resilient extension and contraction portion that is provided with a tubular portion disposed in the lengthwise direction of the lower side upper leg portion, and a sliding portion slidably inserted into the tubular portion, and a spring member fitted inside the tubular portion may be used.

A motor such as a geared motor may be used as the horizontal swivel driving portion and the upper leg driving and turning portion. Also, turning axes fixed at the horizontal swivel portion and the upper side upper leg portion are turned via one through a plurality of gears, whereby it is possible to drive and turn the horizontal swivel portion and the upper side upper leg portion.

A quadruped walking robot according to Claim 2 of the present invention has a construction in the invention of Claim 1, in which the resilient extension and contraction portion includes a tubular portion disposed in the lengthwise direction of the lower side upper leg portion, a sliding portion slidably inserted into the tubular portion, and a spring member fitted inside the tubular portion and pressing the sliding portion in the extension and contraction direction.

With the construction, the following actions can be brought about in addition to those of Claim 1.

(1) Since the sliding portion inserted into the tubular portion slides along the inner wall of the tubular portion, and at the same time, is pressed by a spring member fitted in the tubular portion, the resilient extension and contraction portion is resiliently extended and contracted, wherein it is possible to vary the posture of the leg portions corresponding to movement of the main body portion and the posture thereof at the time. Therefore stabilized walking can be carried out.

A quadruped walking robot according to Claim 3 of the present invention has a construction in the invention of Claim 1 or Claim 2, in which a locking mechanism portion, disposed in the resilient extension and contraction portion of the respective leg portions, for locking and unlocking the resilient extension and contraction portion is provided.

With the construction, the following actions can be brought about in addition to those of Claim 1 or Claim 2.

(1) Since the resilient extension and contraction portion can be locked or unlocked so as not to extend and contract by the locking mechanism portion, the resilient extension and contraction portion is resiliently extended and contracted by unlocking the same where the quadruped walking robot carries out crawl walking, and a stabilized walking motion can be carried out. For example, where a trot walking motion is carried out, the resilient extension and contraction portion is locked to cause the lower leg portion not to be inclined toward the main body portion due to movement of the main body portion, etc., wherein a stabilized trot walking motion can be carried out.

Herein, there are some locking mechanism portions, one of which is provided with a locking hole drilled in the tubular portion and an insertion pin inserted into the locking hole, wherein locking is carried out by inserting the insertion pin into the locking hole, and the other of which is provided with a solenoid, an insertion pin fixed at the movable portion of the solenoid, and a locking hole or a locking groove formed in the resilient extension and contraction portion, into which the insertion pin is inserted, wherein locking is carried out by the insertion pin being inserted into the locking hole or the locking groove by supplying electricity to the solenoid.

A quadruped walking robot according to a fourth aspect of the present invention has a construction in the invention of the third aspect, in which the locking mechanism portion is provided with a locking hole drilled in the tubular portion and an insertion pin inserted into the locking hole.

With the construction, the following actions can be brought about in addition to those of Claim 3.

(1) By inserting the insertion pin into the locking hole, it is possible to prevent the sliding portion from sliding inside the tubular portion, and by pulling out the insertion pin from the locking hole, it is possible to unlock the sliding portion.

EFFECTS OF THE INVENTION

As described above, with the quadruped walking robot according to the present invention, the following advantageous effects can be brought about.

According to the invention of Claim 1,
(1) As for the leg portion, since a dual-driving system having two driving portions per leg portion is employed, it is possible to provide a leg walking robot capable of reducing the number of driving portions in comparison with a triple-driving system, reducing the production costs and lightening the weight.
(2) Since, by resiliently extending and contracting the resilient extension and contraction portion, the inclination of the lower leg portion can be varied for the upper side upper leg portion, and the posture of the leg portions can be varied, corresponding to movement of the main body portion and the posture thereof at the time, a quadruped walking robot can be provided, which is excellent in stability and can carry out stabilized walking motions without the grounding portion sliding on the ground even in the case of a dual-driving system including two driving portions per leg portion.
(3) Since the lower side upper leg portion includes a resilient extension and contraction portion although the leg portion is based on a dual-driving system having two driving portions, it is possible to achieve a walking motion close to a normal triple-driving system of three degrees of freedom. Therefore, it is possible to provide a quadruped walking robot, which has excellent stability in walking motions, capable of smoothly walking.

According to the invention of Claim 2, in addition to the effect of Claim 1,
(1) Since the sliding portion inserted into the tubular portion slides along the inner wall of the tubular portion, and at the same time, is pressed by a spring member fitted in the tubular portion, the resilient extension and contraction portion is resiliently extended and contracted, wherein it is possible to vary the posture of the leg portions corresponding to movement of the main body portion and the posture thereof at the time. Therefore, it is possible to provide a quadruped walking robot that is able to carry out stabilized walking and is excellent in stability.

According to the invention of Claim 3, in addition to the effects of Claim 1 or Claim 2,
(1) Since it is possible to lock the resilient extension and contraction portion by the locking mechanism portion so as not to extend and contract and to unlock the same, the resilient extension and contraction portion is resiliently extended and contracted by unlocking the same and stabilized walking motions can be carried out where the quadruped walking robot carries out a crawl walking motion, and, for example, where a trot walking motion is carried out, a stabilized trot walking motion can be executed by locking the resilient extension and contraction portion so that the lower leg portions are not inclined toward the main body portion due to movement of the main body portion. That is, various types of walking movements are possible only by actuating or unlocking the locking mechanism portion, wherein it is possible to provide a quadruped walking robot that is excellent in diversity of walking motions.

According to the invention of Claim 4, in addition to the effects of Claim 3,
(1) It is possible to prevent the sliding portion from sliding inside the tubular portion by inserting the insertion pin into the locking hole, and it is possible to unlock the sliding portion by pulling out the insertion pin from the locking hole. Accordingly, it is possible to provide a quadruped walking robot in which switching of walking motions can be simply carried out.

DESCRIPTION OF THE SYMBOLS

1 Quadruped walking robot
2 Main body portion
2a Upper side main body plate
2b Lower side main body plate
2c Fixing hole
2d Widened portion
20a,3b,3c Leg portions
4 Horizontal swivel portion
4a Upper side swivel plate
4b Lower side swivel plate
4c,4d Side part swivel plates
4e Fixing hole
5 Horizontal swivel driving portion
5a Horizontal driving axis
6 Horizontal driving side gear
7 Horizontal driven side gear
8 Horizontal swivel axis
9 Upper side upper leg portion
9a Upper side upper leg portion turning axis
9b Upper leg driven side gear
10 Upper leg driving and turning portion
10a Upper leg driving axis 10b Upper leg driving side gear
11 Lower side upper leg portion
11a Lower side upper leg turning axis
11b Lower leg portion side member
11c Horizontal swivel portion side member
12 Resilient extension and contraction portion
12a Tubular portion
12b Sliding portion
12c Spring member
13 Lower leg portion
13a, 13b Lower leg plates
14 Upper side lower leg axis
15 Lower side lower leg axis
16 Shock-absorbing portion
17,17a,17b,17c Grounding portions
18a,18b Supporting polygons
19a,19b ZMPs
20a,20b Setting ZMPs
21 Locking mechanism portion
22 Casing portion
23 Solenoid portion
24,28 Insertion pins
25,27 Locking holes
26 Locking groove

DETAILED DESCRIPTION OF PREFERRED EMBODIMENTS

Hereinafter, a description is given of one embodiment of the present invention with reference to FIG. 1 through FIG. 7.

First Embodiment

Figure 1:
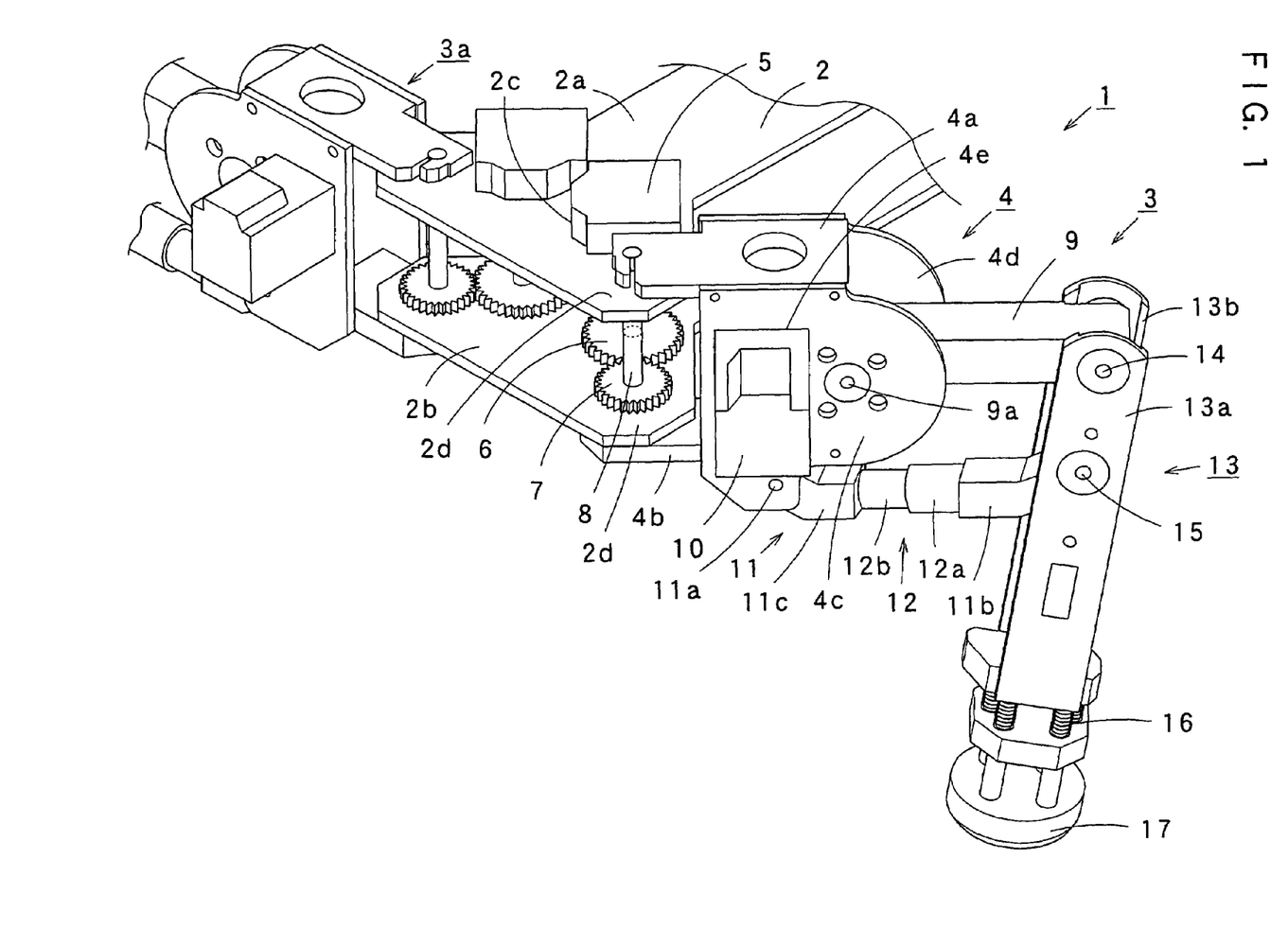
FIG. 1 is a perspective view depicting the major parts of the leg portion of the front part of a quadruped walking robot according to a first Embodiment.
Figure 2:
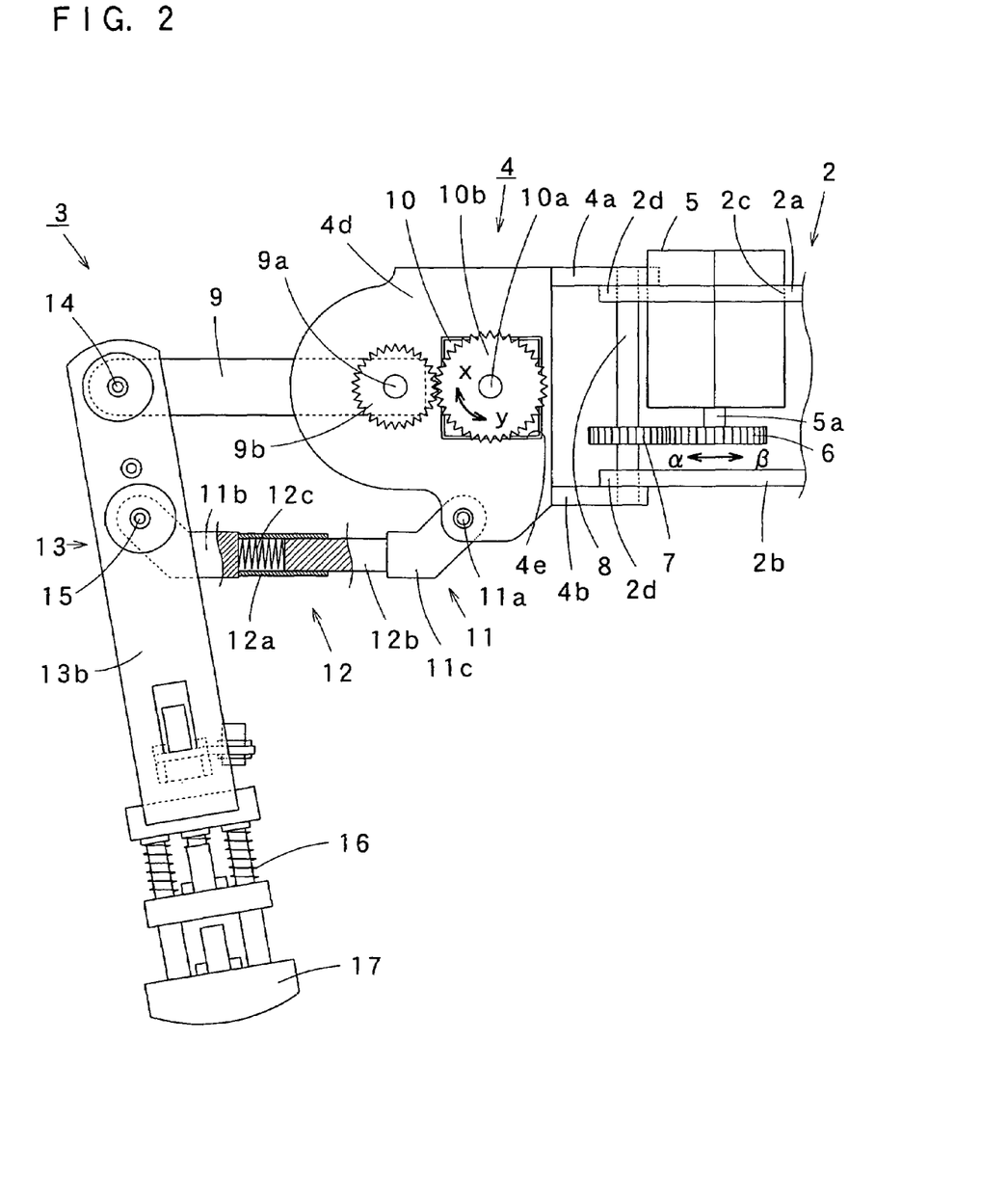
FIG. 2 is a rear side view of a leg portion of the quadruped walking robot according to the first Embodiment.

FIG. 1 is a perspective view depicting the major parts of the leg portion of the front part of a quadruped walking robot according to the first Embodiment, and FIG. 2 is a rear side view of a leg portion of the quadruped walking robot according to the first Embodiment. Also, although a description is given of only one leg portion of the front part of the quadruped walking robot, the respective leg portions have the same construction, and a description of the other leg portions is omitted.

In the drawing, reference numeral 1 denotes a quadruped walking robot according to the first Embodiment, and reference numeral 2 denotes a main body portion composed of an upper side main body plate 2a and a lower side main body plate 2b vertically disposed parallel to each other and having widened portions 2d at the front end portion thereof and the rear end portion thereof. Reference numeral 20a denotes left and right leg portions at the front part of the quadruped walking robot 1. Reference numeral 4 denotes a horizontal swivel portion provided at the side of the widened portion 2d of the main body portion 2 so as to freely swivel in the horizontal direction. Reference numeral 5 denotes a horizontal swivel driving portion, which is fitted and fixed in a rectangular fixing hole 2c drilled at the upper side main body plate 2a of the main body portion 2, for driving and swiveling the horizontal swivel portion 4. Reference numeral 6 denotes a horizontal driving side gear fixed at the horizontal driving axis 5a (Refer to FIG. 2) of the horizontal swivel driving portion 5. Reference numeral 7 denotes a horizontal driven side gear engaged with the horizontal driving side gear 6, and reference numeral 8 denotes a horizontal swivel axis fixed at the horizontal driven side gear 7. The horizontal swivel portion 4 is composed of an upper swivel plate 4a on the upper side, a lower side swivel plate 4b on the lower side, and side swivel plates 4c and 4d at both side portions. The horizontal swivel axis 8 has the upper end portion and the lower end portion fixed at the upper side swivel plate 4a and the lower side swivel plate 4b, which are rotatably axially supported at the upper side main body plate 2a of the main body portion 2 and the lower side main body plate 2b thereof.

Reference numeral 9 denotes an upper side upper leg portion rotatably axially supported at the horizontal swivel portion 4 in the vertical direction at one end part thereof. Reference numeral 9a denotes an upper side upper leg portion turning axis fixed at one end portion of the upper side upper leg portion 9 and rotatably axially supported at the side portion swivel plates 4c and 4d. Reference numeral 10 denotes an upper leg turning and driving portion, which is fitted and fixed in a rectangular fixing hole 4e drilled in the side portion swivel plate 4c, for driving and turning the upper side upper leg portion 9. Reference numeral 11 denotes a lower side upper leg portion disposed roughly parallel to the lower part of the upper side upper leg portion 9 and rotatably axially supported at the horizontal swivel portion 4 at one end part thereof. Reference numeral 11a denotes a lower side upper leg turning axis fixed at one end portion of the lower side upper leg portion 11 and rotatably axially supported at the side portion swivel plates 4c and 4d. Reference numeral 12 denotes a resilient extension and contraction portion disposed at an intermediate portion of the lower side upper leg portion 11. Reference numeral 12a denotes a tubular portion disposed along the lengthwise direction of the lower side upper leg portion 11 and fixed at the lower leg portion side member 11b, and 12b denotes a sliding portion fixed at the horizontal swivel portion side member 11c of the lower side upper leg portion 11 and slidably inserted into the tubular portion 12a. Reference numeral 13 denotes a lower leg portion whose upper part is axially supported at the upper side upper leg portion 9 and at the other end portion of the lower side upper leg portion 11. Reference numerals 13a and 13b denote a front side lower leg plate and a rear side lower leg plate of the lower leg portion 13, respectively. Reference numeral 14 denotes an upper side lower leg axis fixed at the other end portion of the upper side upper leg portion 9 and axially supported at the upper end portion of the lower leg portion 13. Reference numeral 15 denotes a lower side lower leg axis fixed at the other end portion of the lower side upper leg portion 11 and axially supported at the lower part of the upper side lower leg axis 14 of the lower leg portion 13. Reference numeral 16 denotes a shock-absorbing portion composed of a plurality of supporting pins provided at the lower end portion of the lower leg portion 13 along the lengthwise direction and spring members fitted to the respective supporting pins. Reference numeral 17 denotes a grounding portion disposed at the lower part of the shock-absorbing portion 16, the lower part of which is formed to be curvature-shaped.

In FIG. 2, reference numeral 5a denotes a driving axis of the horizontal swivel driving portion 5, which is a horizontal driving axis having a horizontal driving gear 6 fixed thereon, and 9b denotes an upper leg driven side gear fixed on the upper side upper leg turning axis 9a. Reference numeral 10a is an upper leg driving axis that is a driving axis of the upper leg turning and driving portion 10, and 10b denotes an upper leg driving side gear fixed at the upper leg driving axis 10a and engaged with the upper leg driven side gear 9b. Reference numeral 12c denotes a spring member fitted inside the tubular portion 12b, one end of which is fixed at the bottom portion of the tubular portion 12a and the other end of which is fixed at the distal end of the sliding portion 12b.

Herein, a geared motor may be used as the horizontal swivel driving portion 5 and the upper leg driving and turning portion 10.

With respect to the quadruped walking robot 1 according to the first Embodiment constructed as described above, a description is given below of the walking motions thereof with reference to FIGS. 1 and 2.

First, a description is given of basic motions of a leg portion, in which the leg portion 3 is made into an idle leg from a grounded state, is swiveled in the horizontal direction, and thereafter is grounded.

As depicted in FIGS. 1 and 2, in order to raise the lower leg portion 12 upward from a state where the grounding portion 17 is grounded on the ground and to make the leg portion 3 into an idle leg, the upper leg driving and turning portion 10 is driven to turn the upper leg driving side gear 10b in the direction of the arrow y in FIG. 2, and the upper leg driven side gear 9b engaged with the upper leg driving side gear 10b is turned rightward of the arrow, wherein the upper side upper leg portion 9 is turned upward. In line therewith, the lower leg portion 13 moves upward. Also, since the lower side upper leg portion 11 is turned upward in line with upward turning of the upper side upper leg portion 9, the grounding portion 17 of the lower leg portion 13 is able to keep a downward-faced posture.

In order to swivel the leg portion 3 in the horizontal direction in a state where the leg portion 3 is made into an idle leg, the horizontal driving side gear 6 is turned in the direction of the arrow β by driving the horizontal swivel driving portion 5, and the horizontal driven side gear 7 engaged with the horizontal driving side gear 6 is turned rightward when observed from upward. Then, the horizontal swivel portion 4 is turned rightward. Accordingly, the leg portion 3 is swiveled forward.

When the leg portion 3 is swiveled to a predetermined position, the upper leg turning and driving portion 10 is driven to turn the upper leg driving side gear 10b rightward (in the direction of the arrow x) in FIG. 2, and the upper leg driven side gear 9b is turned leftward to turn the upper side upper leg portion 9 downward, wherein the leg portion 13 is moved downward to ground the grounding portion 17.

In addition, in order to carryout a smooth walking motion, the movement of the lower leg portion 13 in the vertical direction and the swivel motion of the leg portion 3 in the horizontal direction can be simultaneously carried out. At this time, the grounding portion 17 depicts a roughly arc-shaped locus.

Next, a description is given of a crawl walking motion based on repeated execution of the basic motions of the leg portion, which has been described above, with respect to the respective leg portions sequentially, with reference to FIG. 3.

FIG. 3A through 3E are schematic views describing a crawl walking motion of a quadruped walking robot according to Embodiment 1.

In FIG. 3, reference numeral 1 denotes a quadruped walking robot, FIG. 2 denotes a main body portion, and FIG. 3, 3A, 3B, and 3C denote leg portions. Reference numerals 17, 17a, 17b, and 17c denote grounding portions of the tips of the respective leg portions 3, 3a, 3b, and 3c.

Figure 3A:
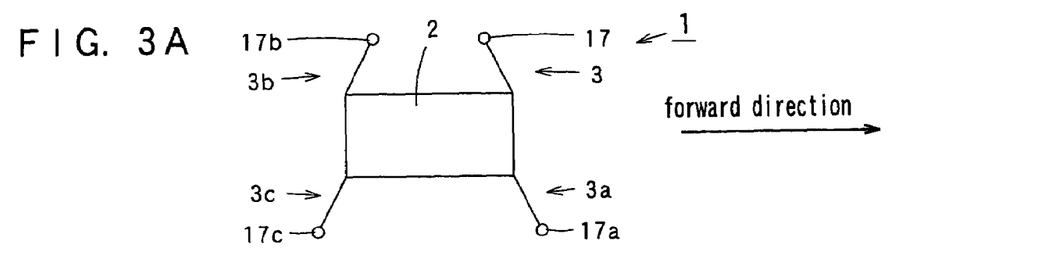
FIG. 3A is a schematic view describing a crawl walking motion of a quadruped walking robot according to the first Embodiment.

As depicted in FIG. 3A, the grounding portions 17, 17a, 17b, and 17c are grounded on the ground in a state where the quadruped walking robot is stopped.

Figure 3B:
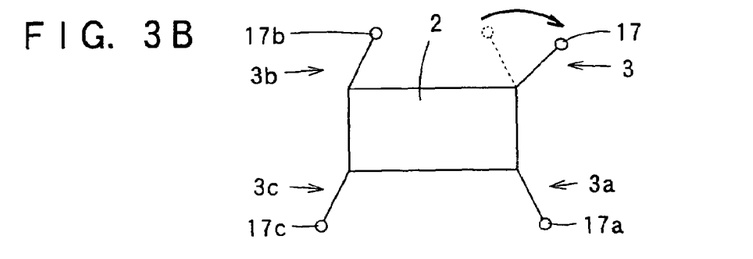
FIG. 3B is a schematic view describing a crawl walking motion of a quadruped walking robot according to the first Embodiment.

As depicted in FIG. 3B, the lower leg portion 13 of the leg portion 3 is moved upward, and simultaneously the leg portion 3 is swiveled in the forward direction. At this time, the leg portion 3 is an idle leg, and the grounding portion 17 thereof is off the ground. Further, the leg portions 3a, 3b and 3c are grounding legs, and the grounding portions 17a, 17b and 17c thereof are grounded, wherein the main body portion 2 is supported at three points. After the leg portion 3 is swiveled in the forward direction, the lower leg portion 13 is moved downward to ground the grounding portion 17.

Figure 3C:
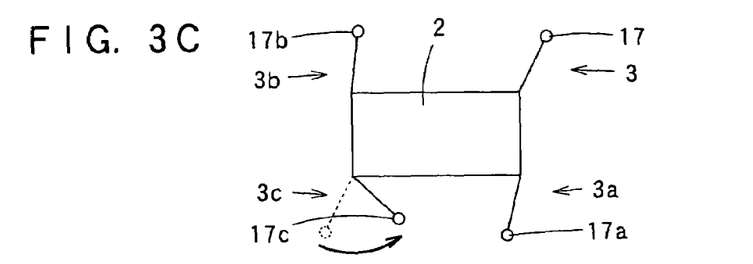
FIG. 3C is a schematic view describing a crawl walking motion of a quadruped walking robot according to the first Embodiment.
Figure 3D:
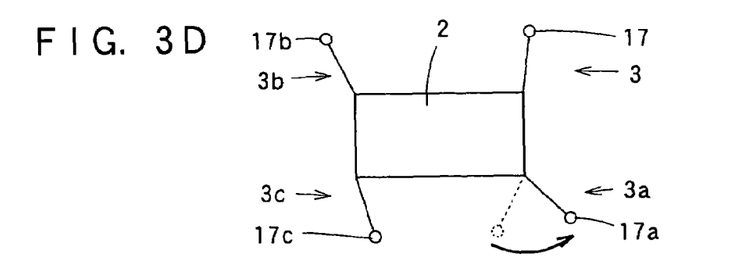
FIG. 3D is a schematic view describing a crawl walking motion of a quadruped walking robot according to the first Embodiment.
Figure 3E:
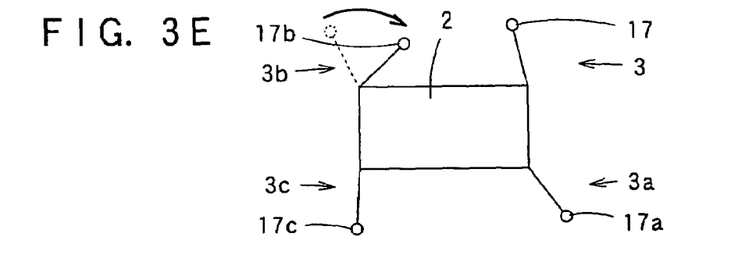
FIG. 3E is a schematic view describing a crawl walking motion of a quadruped walking robot according to the first Embodiment.

Subsequently, as depicted in FIG. 3C through 3E, the other leg portions 3a, 3b and 3c are made into idle legs as in the above-described leg portion 3, in the order of the leg portion 3c (FIG. 3C), the leg portion 3a (FIG. 3D) and the leg portion 3b (FIG. 3E). At this time, the other remaining three leg portions are made into grounding legs and support the main body portion 2. The leg portions 3a, 3b and 3c that are made into idle legs are swiveled forward, and are stepped forward in the advancing direction by turns and grounded, whereby the quadruped walking robot 1 carries out a crawl walking motion.

In addition, in FIG. 3, a description is given of walking in the forward direction of the quadruped walking robot 1. However, by adequately controlling the horizontal swivel direction of the leg portions 3, 3a, 3b and 3c and sequence by which the leg portions are made into idle legs, the quadruped walking robot 1 can move rearward, turn, and stamp its feet, etc.

Figure 4A:
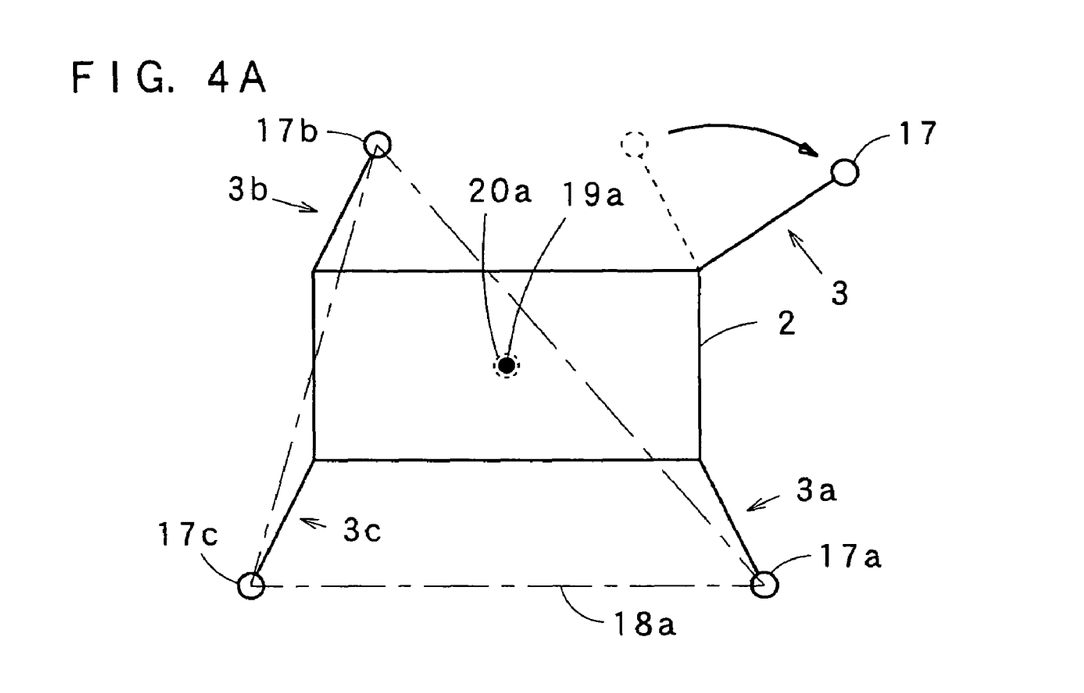
FIG. 4A is a schematic view describing ZMP control when a quadruped walking robot according to the first Embodiment makes a crawl walking motion.
Figure 4B:
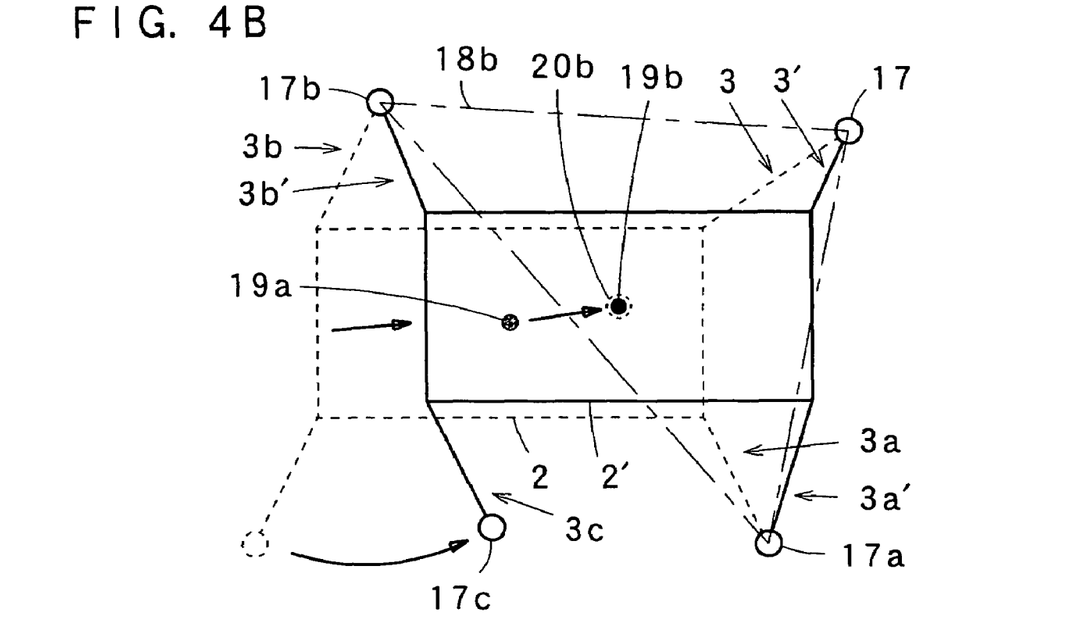
FIG. 4B is a schematic view describing ZMP control when a quadruped walking robot according to the first Embodiment makes a crawl walking motion.

Next, a description is given of ZMP control in crawl walking, with reference to FIG. 4.

FIGS. 4A and 4B are schematic views describing the ZMP control for a crawl walking motion of a quadruped walking robot according to the first Embodiment.

In FIG. 4, reference numeral 18a denotes a supporting polygon which is a triangle in which the grounding portions 17a, 17b and 17c on the ground are the vertices. Reference numeral 18b denotes a supporting polygon which is a triangle in which the grounding portions 17, 17a and 17b are the vertices. Reference numerals 19a and 19b denote ZMPs (Zero Moment Points) that are the points on the ground where the total sum of the gravities of the respective parts of the quadruped walking robot 1 and the moments due to inertia becomes zero. Reference numerals 20a and 20b denote setting ZMPs preset so that the ZMPs are located inside the supporting polygons 18a and 18b. The setting ZMPs 20a and 20b are established inside the supporting polygons 18a and 18b, and at the same time are set at such a position where smooth walking can be carried out, for example, a position where a gravity does not greatly change in the crawl walking motion.

As depicted in FIG. 4A, the leg portion 3 is an idle leg, and the leg portions 3a, 3b and 3c are the grounding legs. The grounding portions 17a, 17b and 17c are grounded and support the main body portion 2 at three points. Since the ZMP 19a in the state supported by the three points is made coincident with the setting ZMP 20a set in advance, the quadruped walking robot 1 does not fall down.

As depicted in FIG. 4B, the leg portion 3 that was an idle leg is grounded. Continuously, when the leg portion 3c is made into an idle leg, the control unit (not shown) first calculates the ZMP 19b when the main body portion is supported by the grounding portions 17, 17a and 17b of the leg portions 3, 3a and 3b at three points. Herein, the ZMP 19a is calculated by a ZMP equation on the basis of the position and posture of the main body portion 2.

Next, the control unit drives the horizontal swivel driving portion 5 and the upper leg driving and turning portion 10 of the respective leg portions 3, 3a and 3b as the grounding legs, and controls the position and posture of the main body portion 2. That is, the horizontal swivel driving portion 5 of the respective leg portions 3, 3a and 3b is driven, and the respective leg portions 3, 3a and 3b are swiveled backward. At this time, since the grounding portions 17, 17a and 17b of the respective leg portions 3, 3a and 3b are grounded on the ground, the main body portion 2 moves to the position of a roughly forward position of the main body portion 2' toward the forward direction by backward swivel of the respective leg portions 3, 3a and 3b, and the leg portions 3, 3a and 3b move to the positions of the leg portions 3', 3a' and 3b'. Further, it is possible to incline the posture of the main body portion 2 by driving the upper leg turning and driving portion 10 of the leg portions 3, 3a and 3b.

As described above, the quadruped walking robot 1 carries out crawl walking and moves forward while the control unit is controlling the posture of the main body portion 2 so that the ZMP 19b of the quadruped walking robot 1 is made coincident with the setting ZMP 20b set inside the supporting polygon 18b.

Also, as depicted in FIG. 4B, where the main body portion 2 moves roughly forward in a state where the grounding portions 17, 17a and 17b of the leg portions 3, 3a and 3b are grounded, the main body portion 2 is caused to smoothly move by the resilient extension and contraction portion 12 secured at the respective leg portions 3, 3a and 3b. Hereinafter, a description is given of motions of the resilient extension and contraction portion.

Figure 5A:
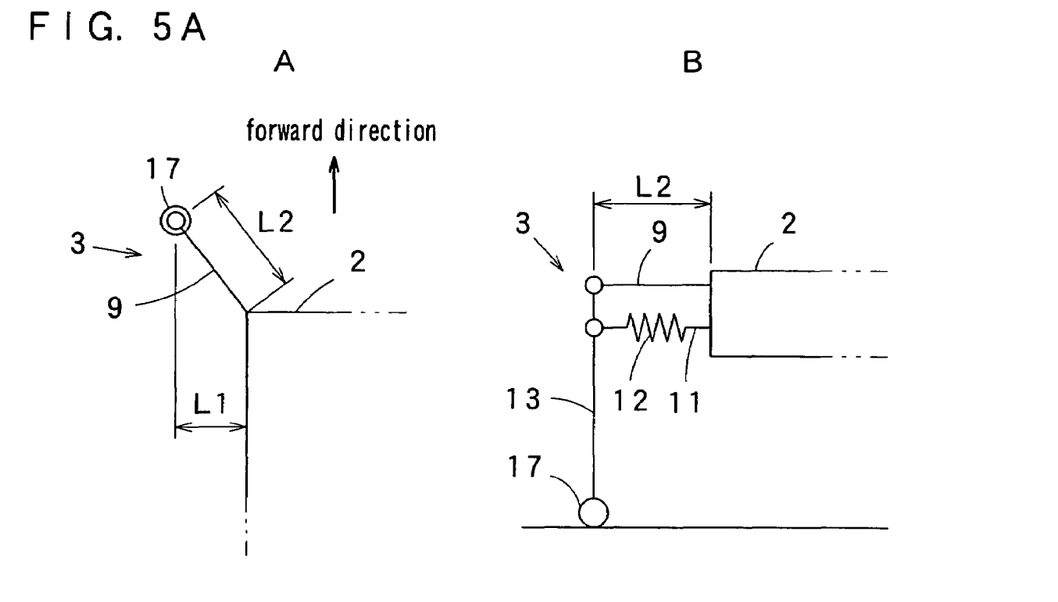
FIG. 5A is a schematic view describing a motion of a resilient extension and contraction portion of a quadruped walking robot according to the first Embodiment.
Figure 5B:
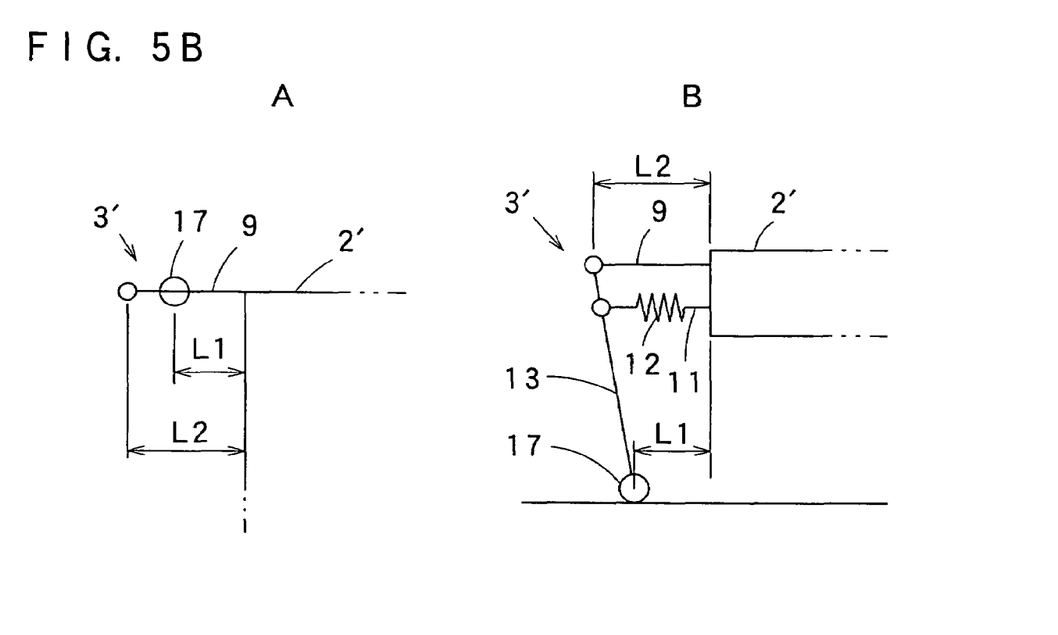
FIG. 5B is a schematic view describing a motion of a resilient extension and contraction portion of a quadruped walking robot according to the first Embodiment.

FIG. 5A and FIG. 5B are schematic views describing motions of the resilient extension and contraction portion of a quadruped walking robot according to the first Embodiment. Also, in the drawings, reference symbol "A" and "B" are plan views and side views, respectively.

In FIG. 5, reference symbol L1 denotes a distance between the side portion of the main body portion 2 and the grounding portion 17, and L2 denotes a swivel radius of the leg portion 3 in the horizontal direction.

As depicted in FIG. 5A, the grounding portion 17 of the leg portion 3 is grounded diagonally forward left of the main body portion 2. In this state, when the main body portion 2 moves in the forward direction as described in FIG. 4B, the leg portion 3' becomes roughly orthogonal to the side portion of the main body portion 2' on the plane as depicted in FIG. 5B. Since the distance L1 between the side portion of the main body portion 2' and the grounding portion 17 is roughly the same as the distance in the before-forwarding state depicted in FIG. 5A, the distance L1 is smaller than the swivel radius L2 of the leg portion 3. Therefore, the resilient extension and contraction portion 12 provided at the lower side upper leg portion 11 is caused to contract, wherein the grounding portion 17 side of the lower leg portion 13 is entered into an inclined state toward the side portion of the main body portion 2'.

Herein, the quadruped walking robot 1 according to the first Embodiment has two degrees of freedom because it is of a dual-driving system having two driving portions 5 and 10 for one leg portion 3. Therefore, although it is not possible to set the posture of the leg portion 3 in a grounded state to an optional posture, it is possible to vary the posture of the lower leg portion 13 of the leg portion 3', corresponding to movement of the main body portion 2', by extending and contracting the resilient extension and contraction portion 12 as described above, wherein the quadruped walking robot 1 can carry out stable walking without the grounding portion 17 slipping on the ground.

Further, differing from the crawl walking motion, it is possible to carry out a trot walking motion, in which a pair of leg portions on a diagonal line of the leg portions 3, 3a, 3b, and 3c, for example, the leg portions 3 and 3c are made into a set, and the one set of leg portions is made into idle legs while the other set of leg portions 3a and 3b are made into grounding legs, and sets of the idle legs and the grounding legs are alternately changed over. The ZMP control for carrying out a trot walking motion is the same as the crawl walking motion, excepting that a rectilinear band-like area connecting a set of grounded leg portions on a diagonal line together, for example, the grounding portions 17 of the leg portions 3 and 3c, is made into a supporting polygon, the setting ZMP is established inside the corresponding supporting polygon, and the position and posture of the main body portion 2 is controlled so that a ZMP is set to accord with the setting ZMP.

In addition, where a trot walking motion is carried out, in order to carry out a stabilized walking motion, it is possible to fix extension and contraction of the resilient extension and contraction portion 12 so that the grounding portion 17 side of the lower leg portion 13 is not inclined toward the side portion of the main body portion 2' due to extension and contraction of the resilient extension and contraction portion 12 by the locking mechanism portion. Hereinafter, a description is given of the locking mechanism portion with reference to FIG. 6.

Figure 6:
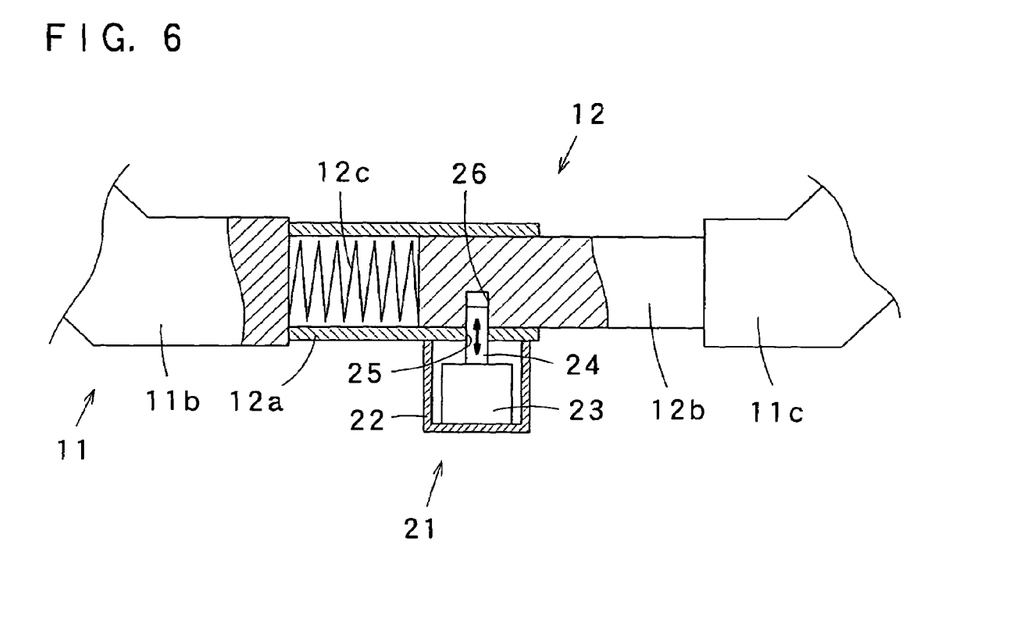
FIG. 6 is a partially sectional side view of the major parts of a locking mechanism portion.

FIG. 6 is a partially sectional side view depicting the major parts of the locking mechanism portion.

In FIG. 6, reference numeral 11 denotes a lower side upper leg portion, 12 denotes a resilient extension and contraction portion, 12a denotes a tubular portion, 12b denotes a sliding portion, 12c denotes a spring member, 21 denotes a locking mechanism portion, 22 denotes a casing portion disposed on the outer wall of the tubular portion 12a, 23 denotes a solenoid portion disposed inside the casing portion 22, 24 denotes an insertion pin fixed at the movable part of the solenoid portion 23, 25 denotes a locking hole drilled in the tubular portion 12a, and 26 denotes a locking groove provided at a position communicating with the locking hole 25 with a predetermined extension and contraction length of the sliding portion 12b.

As depicted in FIG. 6, at the locking mechanism portion 21, the solenoid portion 23 causes the insertion pin 24 to be inserted into the locking hole 25 and the locking groove 26 by supplying electricity, or causes the inserted pin 24 to be pulled out. By the insertion pin 24 being inserted into the locking hole 25 and the locking groove 26, the sliding portion 12b is fixed with respect to the tubular portion 12a, where the resilient extension and contraction portion 12 can be fixed so as not to extend and contract.

Therefore, since the resilient extension and contraction portion 12 secured at the lower side upper leg portion 11 is not extended and contracted, there is no case where the lower leg portion 13 is inclined toward the main body portion 2 due to movement of the main body portion 2. Since, in the ZMP control for a trot walking motion, the position and posture of the main body portion 2 are controlled in a state where the main body portion 2 is supported at two points by leg portions on a diagonal line, it is sufficient that one leg portion has two degrees of freedom, wherein no such trouble occurs as the grounding portion 17 slips in a crawl walking motion. Therefore, since the lower leg portion 13 can hold a roughly vertical posture without inclining by fixing the resilient extension and contraction portion 12 so as not to extend and contract, stabilized trot walking can be carried out without swaying of the main body portion 2. Additionally, by pulling out the insertion pin 24 from the locking hole 25 and the locking groove 26, the resilient extension and contraction portion 12 can be resiliently extended and contracted by the spring member 12c. Therefore, the control unit (not shown) controls the electric current flowing in the solenoid portion 23 of the locking mechanism portion 21 and unlocks the resilient extension and contraction portion 12 so as not to extend and contract, and it is possible to carry out stabilized crawl walking as described above. Thus, when selecting crawl walking or trot walking, it is possible to determine whether or not the resilient extension and contraction portion 12 is extended and contracted in response to the walking motion.

Figure 7:
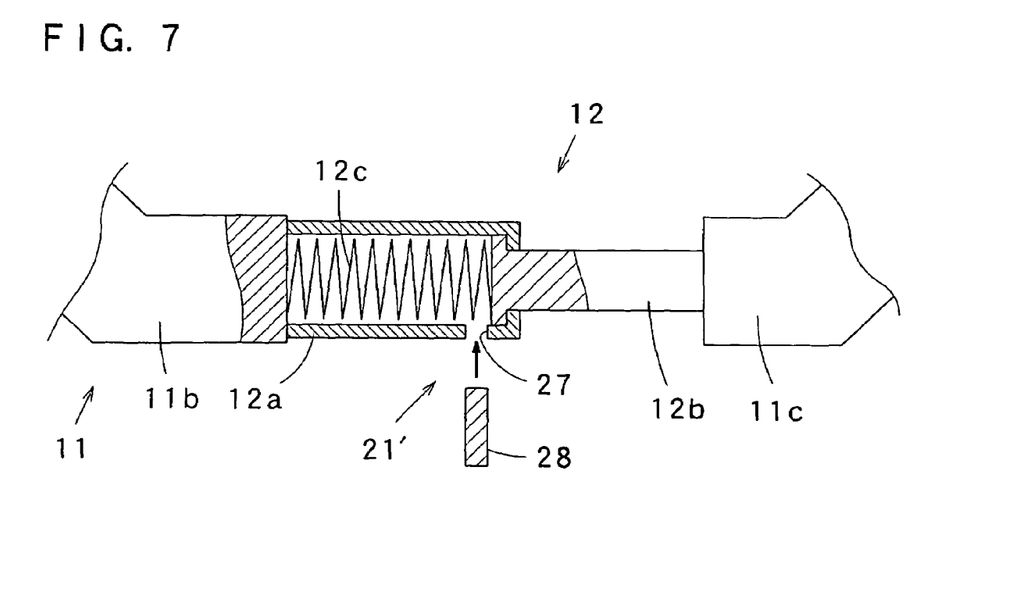
FIG. 7 is a partially sectional side view of the major parts depicting another example of the locking mechanism portion.

Next, a description is given of another example of the locking mechanism portion with reference to FIG. 7.

FIG. 7 is a partially sectional side view depicting the major parts of another example of the locking mechanism portion.

In FIG. 7, reference numeral 21' denotes a locking mechanism portion, 27 denotes a locking hole drilled in the tubular wall of the tubular portion 12a, and 28 denotes an insertion pin inserted into the locking hole 27.

As depicted in FIG. 7, since the resilient extension and contraction portion 12 can be manually locked and unlocked so as not to extend and contract by inserting the insertion pin 28 into the locking hole 27 or pulling out the same therefrom, the insertion pin 28 is pulled out from the locking hole 27 where crawl walking is carried out, and the insertion pin 28 is inserted into the locking hole 27 where trot walking is carried out, wherein it is possible to carry out stabilized walking when causing the quadruped walking robot 1 to perform either walking.

Since the quadruped walking robot 1 according to the first Embodiment is constructed as described above, it has the following actions.

(1) By driving the upper leg driving and turning portion 10 of the leg portion 3, the upper leg driving side gear 10b is turned, and the upper leg driven side gear 9b engaged with the upper leg driving side gear 9a is turned, wherein the upper side upper leg portion 9 is turned and moved in the upward direction or in the downward direction, and the lower leg portion 13 can be made into an idle leg by moving it in the upward direction, and can be grounded by moving the same in the downward direction. In addition, by driving the horizontal swivel driving portion 5 when the leg portion 3 is made into an idle leg, the horizontal driving side gear 6 is turned, and the horizontal driven side gear 7 engaged with the horizontal driving side gear 6 is turned, wherein the horizontal swivel portion 4 is turned and moved in the right direction or in the left direction, and it is possible to swivel the leg portion 3 in the forward direction or in the backward direction.

(2) It is possible to carry out a crawl walking motion in which motions of making the lower leg portion 13 of the leg portion 3 into an idle leg by moving the same upward, swiveling the leg portion 3 in the forward direction and grounding the same are executed in sequence with respect to the leg portions 3, 3a, 3b and 3c, and it is possible to move the quadruped walking robot 1 forward, backward and swivel the same. At this time, since the control unit controls the posture of the main body portion 2 so that the center of gravity of the quadruped walking robot 1 is located inside a triangle the vertices of which are the grounding portions of the grounding legs while supporting the main body portion 2 by means of the remaining three leg portions other than the leg portion which is an idle leg, stabilized walking motions can be carried out.

(3) As the resilient extension and contraction portion 12 is caused to resiliently extend and contract by the sliding portion 12b inserted into the tubular portion 12a sliding along the inner wall of the tubular portion 12a, at the same time the sliding portion 12b is pressed by the spring member 12c fitted in the tubular portion 12a. When carrying out crawl walking, it is possible to vary the inclination of the lower leg portion 13 in connection to the upper side upper leg portion 9 by extending and contracting the resilient extension and contraction portion 12, and it is possible to vary the posture of the leg portion 3, corresponding to the posture of the main body portion 2. Therefore, stabilized walking can be carried out without the grounding portion 17 slipping on the ground.

(4) The locking mechanism portion 21 locks the sliding portion 12b with respect to the tubular portion 12a by the insertion pin 24 being inserted into the locking hole 25 and the locking groove 26 by supplying electricity of the solenoid portion 23 and locks the resilient extension and contraction portion 12 so as not to extend and contract. Since the lower leg portion 13 is not inclined toward the main body portion 2 due to movement of the main body portion 2, it is possible to carry out stabilized trot walking without swaying even in a two-point supported state. Further, the control unit can lock and unlock the resilient extension and contraction portion 12 so as not to extend and contract by controlling the electric current flowing in the solenoid portion 23, wherein when trot walking is carried out, the resilient extension and contraction portion 12 is locked, and when crawl walking is carried out, the resilient extension and contraction portion 12 is unlocked. That is, the resilient extension and contraction portion 12 can be switched in response to the mode of walking motions.

INDUSTRIAL APPLICABILITY

As described above, the present invention relates to a quadruped walking robot having four leg portions and self-moving by actuating the respective leg portions. In particular, according to the present invention, it is possible to provide a quadruped walking robot the production costs and weight of which can be reduced by reducing the number of driving portions, and which is capable of carrying out stabilized walking motions even with the degree of freedom reduced in the leg portions.

What is claimed is:

1. A quadruped walking robot having four legs at the side portions of the main body portion, wherein the respective leg portions comprise:

a horizontal swivel portion disposed so as to freely swivel in the horizontal direction in the main body portion;

a horizontal swivel driving portion disposed in the main body portion, which drives and turns the horizontal swivel portion in the horizontal direction;

an upper side upper leg portion rotatably axially attached in the horizontal swivel portion so as to freely turn in the vertical direction;

a lower side upper leg portion disposed roughly parallel to the lower part of the upper side upper leg portion, which is rotatably axially attached in the horizontal swivel portion so as to turn in the vertical direction;

an upper leg driving and turning portion disposed in the horizontal swivel portion, which drives and turns the upper side upper leg portion in the vertical direction;

a lower leg portion in which the distal end part of the upper side upper leg portion and the distal end part of the lower side upper leg portion are axially supported vertically at the upper end portion; and a grounding portion disposed at the lower end portion of the lower leg portion; and wherein the lower side upper leg portion is provided with a resilient extension and contraction portion that is disposed at an intermediate part thereof and is resiliently extended and contracted in the lengthwise direction.

2. The quadruped walking robot according to claim 1, wherein the resilient extension and contraction portion comprises: a tubular portion disposed in the lengthwise direction of the lower side upper leg portion; a sliding portion slidably inserted into the tubular portion; and a spring member fitted inside the tubular portion and pressing the sliding portion in the extension and contraction direction.

3. The quadruped walking robot according to claim 2, further comprising a locking mechanism portion, disposed in the resilient extension and contraction portion of the respective leg portions, for locking and unlocking the resilient extension and contraction portion.

4. The quadruped walking robot according to claim 1, further comprising a locking mechanism portion, disposed in the resilient extension and contraction portion of the respective leg portions, for locking and unlocking the resilient extension and contraction portion.

5. The quadruped walking robot according to claim 4, wherein the locking mechanism portion comprises a locking hole drilled in the tubular portion and an insertion pin inserted into the locking hole.

* * * * *